US010471832B2

(12) United States Patent
Bouchard et al.

(10) Patent No.: US 10,471,832 B2
(45) Date of Patent: Nov. 12, 2019

(54) SHOE DERAILMENT DEVICE FOR BRIDGE CRANE AND METHOD OF USE

(71) Applicant: FIVES SERVICES INC., Québec (CA)

(72) Inventors: Steve Bouchard, Saint-Augustin-de-Desmaures (CA); Yan St-Pierre, Ste-Catherine de la Jacques-Cartier (CA); Martin Bordeleau, Lévis (CA)

(73) Assignee: FIVES SERVICES INC., Quebec (CA)

(*) Notice: Subject to any disclaimer, the term of this patent is extended or adjusted under 35 U.S.C. 154(b) by 316 days.

(21) Appl. No.: 15/553,725

(22) PCT Filed: Feb. 27, 2015

(86) PCT No.: PCT/CA2015/050144
§ 371 (c)(1),
(2) Date: Aug. 25, 2017

(87) PCT Pub. No.: WO2016/134444
PCT Pub. Date: Sep. 1, 2016

(65) Prior Publication Data
US 2018/0029476 A1    Feb. 1, 2018

(51) Int. Cl.
*B66C 7/00*      (2006.01)
*B60L 5/36*      (2006.01)
(Continued)

(52) U.S. Cl.
CPC ............... *B60L 5/36* (2013.01); *B60M 1/30* (2013.01); *B66C 7/16* (2013.01); *B66C 13/12* (2013.01);
(Continued)

(58) Field of Classification Search
CPC .... B66C 6/00; B66C 7/00; B66C 7/02; B66C 7/04; B66C 7/16; B61K 5/06; B60M 1/00;
(Continued)

(56) References Cited

U.S. PATENT DOCUMENTS 1,552,004 A    9/1925    Newhall et al.
2,420,595 A    5/1947    Harris
(Continued)

FOREIGN PATENT DOCUMENTS

JP    2009274815 A    11/2009

*Primary Examiner* — Robert J McCarry, Jr.
(74) *Attorney, Agent, or Firm* — Norton Rose Fulbright Canada LLP; Alexandre Daoust

(57) ABSTRACT

The shoe derailment device for use in derailing a conductor shoe assembly of a bridge crane from a conductor rail assembly generally has a wedge head provided at a longitudinal end of a body made of an electrically insulating material, the shoe derailment device being securable to the conductor rail assembly in a derailment position in which the shoe derailment device is positioned outside an operating zone of the bridge crane, with the wedge head facing the operating zone in a manner that if the conductor shoe assembly is moved outside the operating zone, into the area occupied by the shoe derailment device, the conductor shoe assembly is derailed from the conductor rail assembly as the conductor shoe assembly engages the wedge head and is maintained in a derailed state by the electrically insulating material when the conductor shoe assembly is engaged with the body.

20 Claims, 6 Drawing Sheets

(51) Int. Cl.
*B60M 1/30* (2006.01)
*B66C 7/16* (2006.01)
*B66C 13/12* (2006.01)
*B66C 13/50* (2006.01)
*B66C 17/26* (2006.01)

(52) U.S. Cl.
CPC .............. *B66C 13/50* (2013.01); *B66C 17/26* (2013.01); *B60L 2200/26* (2013.01)

(58) Field of Classification Search
CPC . B60M 1/02; B60M 1/12; B60M 1/30; B60M 3/00; B60M 5/00
See application file for complete search history.

(56) References Cited

U.S. PATENT DOCUMENTS

| | | | | |
|---|---|---|---|---|
| 3,525,823 | A * | 8/1970 | Howell, Jr. | B66C 7/00 191/59.1 |
| 4,246,987 | A * | 1/1981 | McMordie | B60M 1/30 191/32 |
| 4,531,460 | A * | 7/1985 | Pamer | B61B 13/04 104/107 |
| 2008/0302033 | A1* | 12/2008 | Insalaco | B66C 7/04 52/220.2 |
| 2012/0097802 | A1* | 4/2012 | Pease | B61K 5/06 246/163 |

* cited by examiner

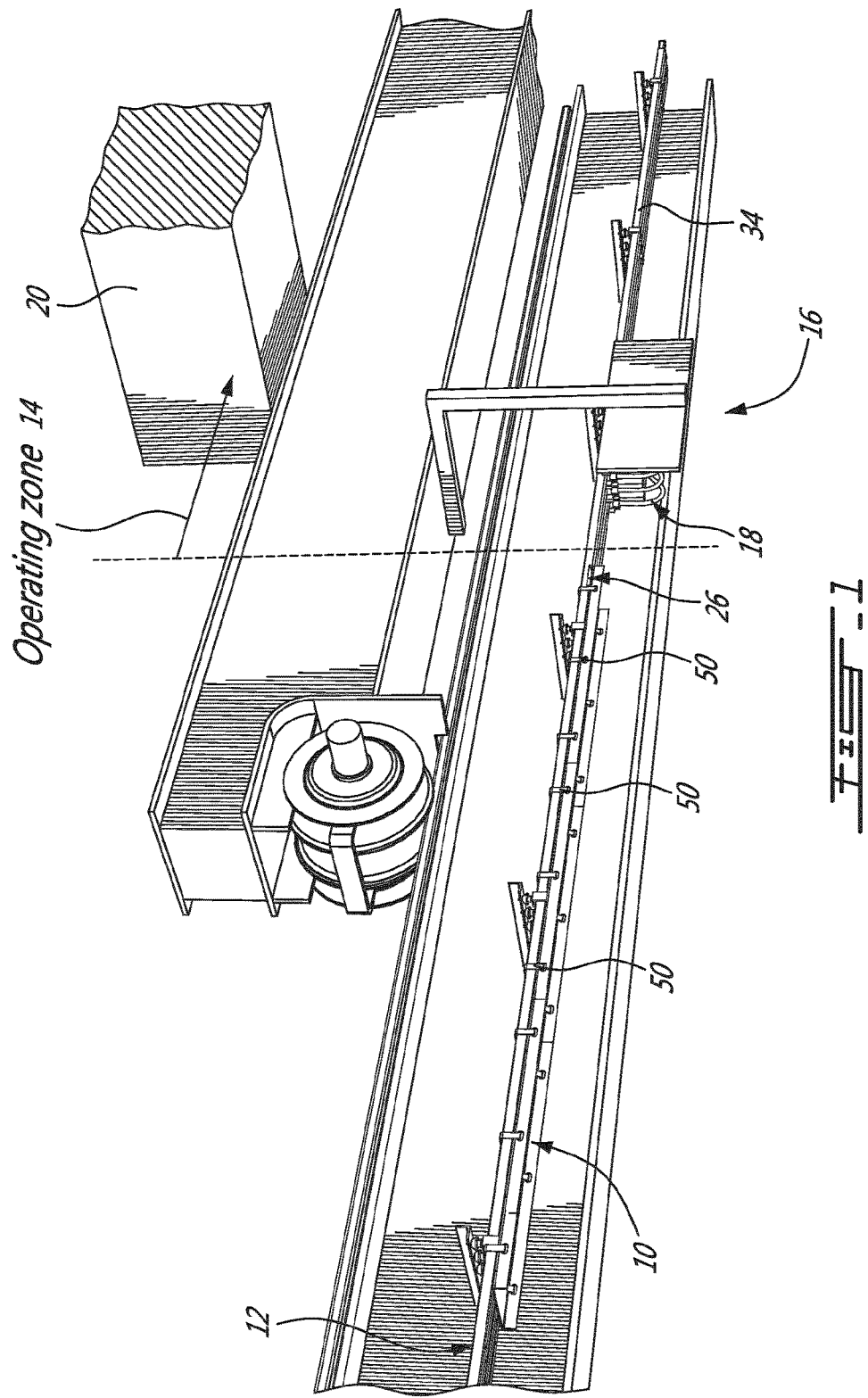

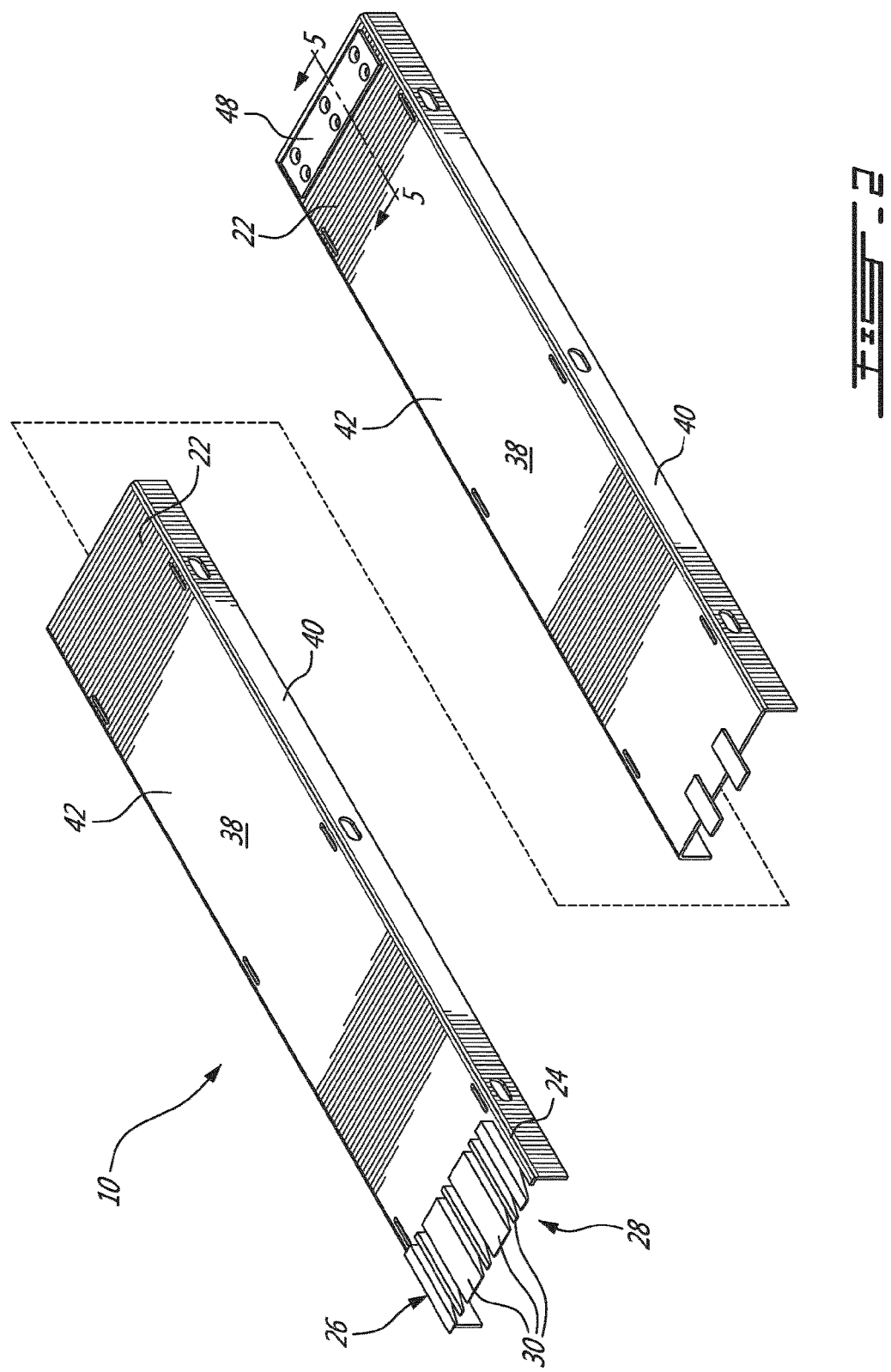

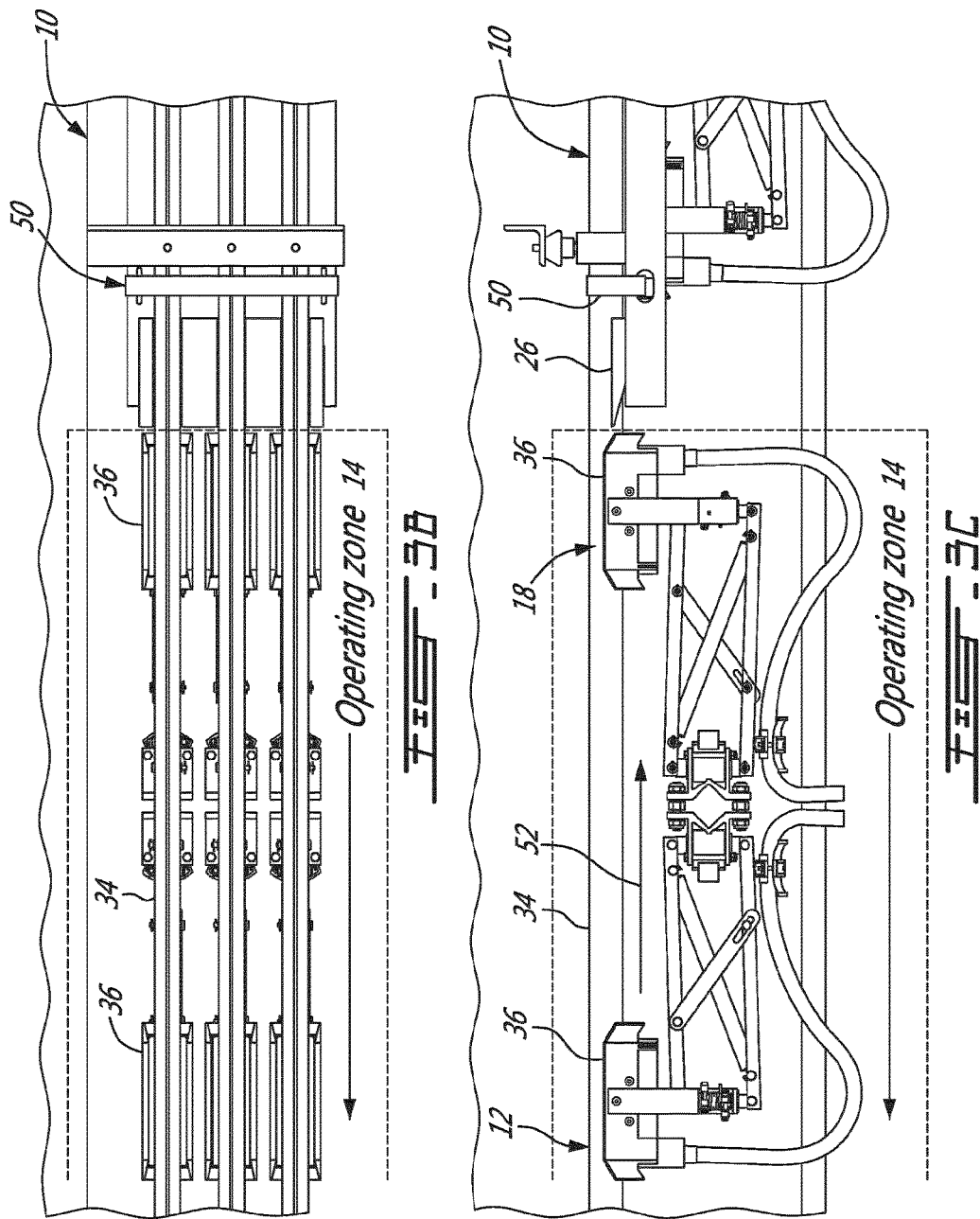

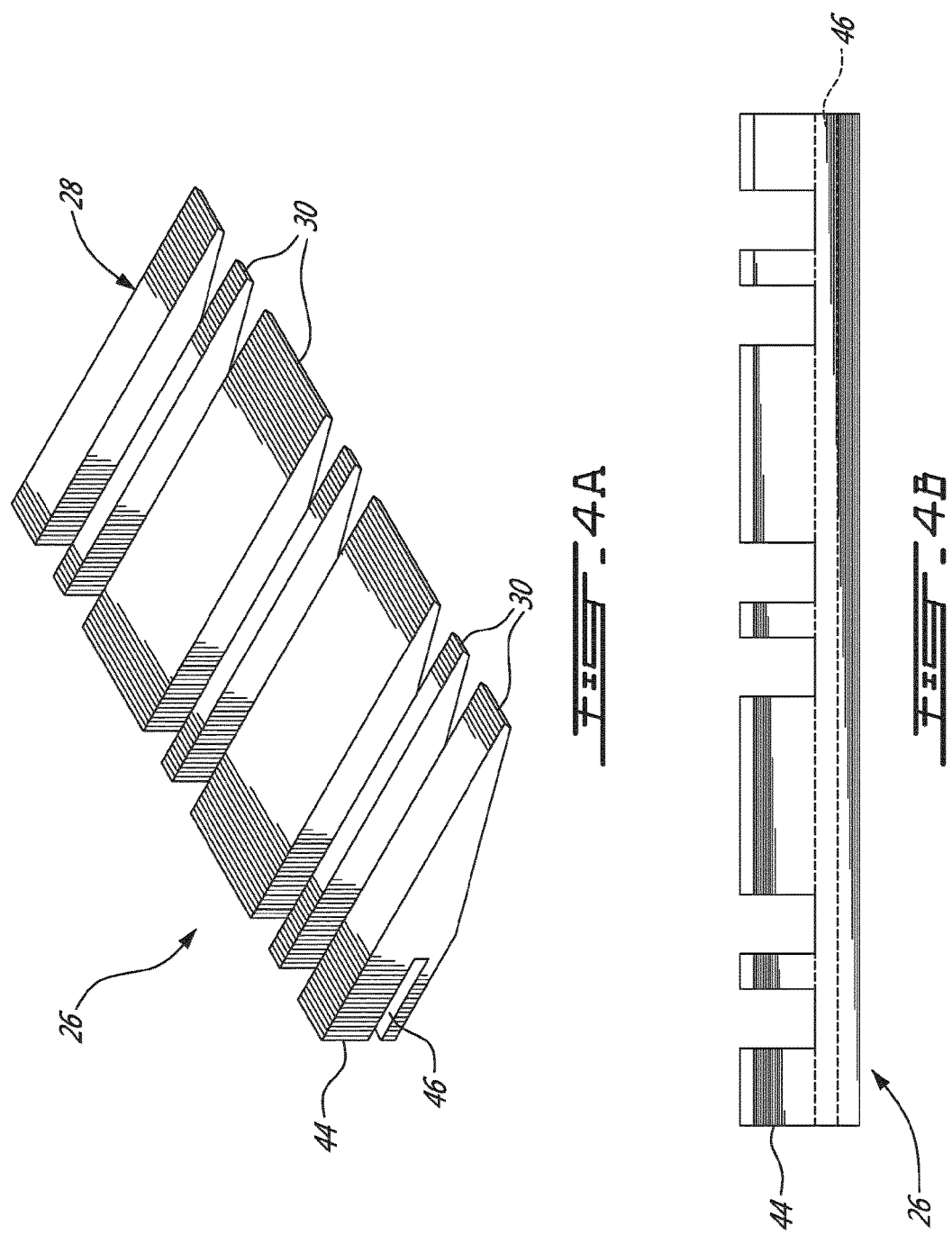

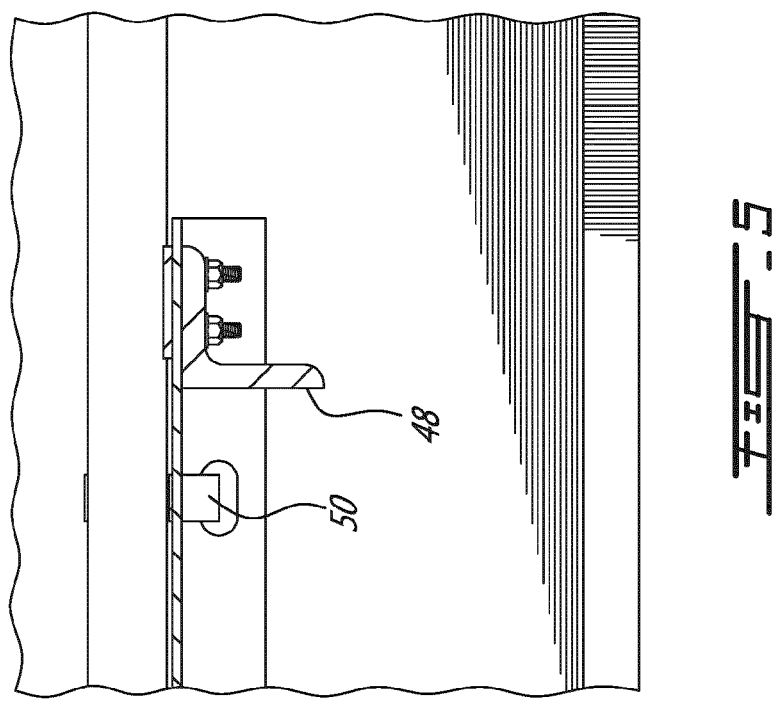

SHOE DERAILMENT DEVICE FOR BRIDGE CRANE AND METHOD OF USE

FIELD

The improvements generally relate to the field of bridge cranes (sometimes referred to as travelling cranes) more particularly to safety devices for such cranes.

BACKGROUND

Bridge cranes are used for moving massive pieces of equipment and the like across a plant, a factory, a construction site and the like. Typical bridge cranes generally have two runway beams being stationary and oriented parallel to one another, a "bridge" having transversal beams which can be collectively moved along the runway beams with an associated mechanism, and a trolley which can be moved along the transversal beams of the bridge, the trolley being adapted to raise, lower, displace, or support massive elements in an operating zone.

Bridge cranes typically have electrical motors used to power the various actions. Many bridge cranes have a fixed conductor rail assembly located adjacent one of the runway beams and which is electrically powered. The electrical power is transferred to the electrical systems of the bridge crane via a conductor shoe assembly which is designed to maintain electrical contact with the conductor rail assembly while the bridge is moved along the runway beams.

In many environments where bridge cranes are used, the movement of the crane should be limited to an restrained operating zone within the total area of the bridge crane. It was known to train operators in order to maintain the movement of the crane within the predetermined operating zone. This approach met limited success as instances when the operator erroneously moved the bridge crane outside the operating zone continued to occur. There thus remained room for improvement.

SUMMARY

There is provided herein a new approach by which a shoe derailment device is positioned in the travelling path of the bridge crane, outside the operating zone, in a manner that if the bridge crane is moved outside the operating zone, into the area occupied by the shoe derailment device, the conductor shoe assembly is separated from the conductor rail assembly by the shoe derailment device, which interrupts the electrical power to the bridge and thus automatically shuts the operation of the electrical motor to stop the movement.

In accordance with one aspect, there is provided a shoe derailment device for use in derailing a conductor shoe assembly of a bridge crane from a conductor rail assembly, the shoe derailment device comprising a wedge head provided at a longitudinal end of a body made of an electrically insulating material, the shoe derailment device being securable to the conductor rail assembly in a derailment position in which the shoe derailment device is positioned outside an operating zone of the bridge crane, in longitudinal alignment with the conductor rail assembly, in a movement path of the conductor shoe assembly, with the wedge head facing the operating zone in a manner that if the conductor shoe assembly is moved outside the operating zone, into the area occupied by the shoe derailment device, the conductor shoe assembly is derailed from the conductor rail assembly as the conductor shoe assembly engages the wedge head and is maintained in a derailed state by the electrically insulating material when the conductor shoe assembly is engaged with the body.

In accordance with another aspect, there is provided a method for derailing a conductor shoe assembly of a bridge crane from a conductor rail assembly, the shoe derailment device including a wedge head provided at a longitudinal end of a body made of an electrically insulating material, the shoe derailment device being secured to the conductor rail assembly in a derailment position in which the shoe derailment device is positioned outside an operating zone of the bridge crane, in longitudinal alignment with the conductor rail assembly, in a movement path of the conductor shoe assembly, with the wedge head facing the operating zone, the method comprising the steps of: derailing the conductor shoe assembly from the conductor rail assembly when the conductor shoe assembly engages the wedge head; and maintaining the conductor shoe assembly in a derailed state by the electrically insulating material when the conductor shoe assembly is engaged with the body.

In accordance with another aspect, there is provided a bridge crane comprising two runway beams being stationary and oriented parallel to one another in a longitudinal orientation, a bridge movably mounted to the two runway beams and having a length extending transversally across the two runway beams, the bridge being operable to move longitudinally along the two runway beams, a trolley mounted to the bridge and being operable to move transversally along the length of the bridge, a conductor rail assembly positioned parallel to and adjacent a corresponding one of the runway beams, a conductor shoe assembly made integral to the bridge and being engaged with the conductor rail assembly, the conductor rail assembly powering the bridge crane during operation via the conductor shoe assembly, the bridge crane being CHARACTERIZED IN THAT a shoe derailment device having a wedge head provided at a longitudinal end of a body made of an electrically insulating material is mounted to the conductor rail assembly in a derailment position in which the shoe derailment device is positioned outside an operating zone of the bridge crane, in longitudinal alignment with the conductor rail assembly, in a movement path of the conductor shoe assembly, with the wedge head facing the operating zone in a manner that if the conductor shoe assembly is moved outside the operating zone, into the area occupied by the shoe derailment device, the conductor shoe assembly is derailed from the conductor rail assembly as the conductor shoe assembly engages the wedge head and is maintained in a derailed state by the electrically insulating material when the conductor shoe assembly is engaged with the body.

Many further features and combinations thereof concerning the present improvements will appear to those skilled in the art following a reading of the instant disclosure.

DESCRIPTION OF THE FIGURES

In the figures,

FIG. 1 is an oblique view of an example of a shoe derailment device installed in a derailment position on a conductor rail assembly of a bridge crane;

FIG. 2 is an exploded view of a shoe derailment device;

FIG. 3B is a top plan view of a portion of the shoe derailment device and conductor rail assembly of FIG. 1;

FIG. 3C is a side elevation view of the portion shown in FIG. 3B;

FIG. 4A is an oblique view of a wedge member of the shoe derailment device of FIG. 2;

FIG. 4B is a rear elevation view of the wedge member of FIG. 4A; and

FIG. 5 is a cross-sectional view taken along cross-section lines 5-5 of FIG. 2.

DETAILED DESCRIPTION

Figure 3A:
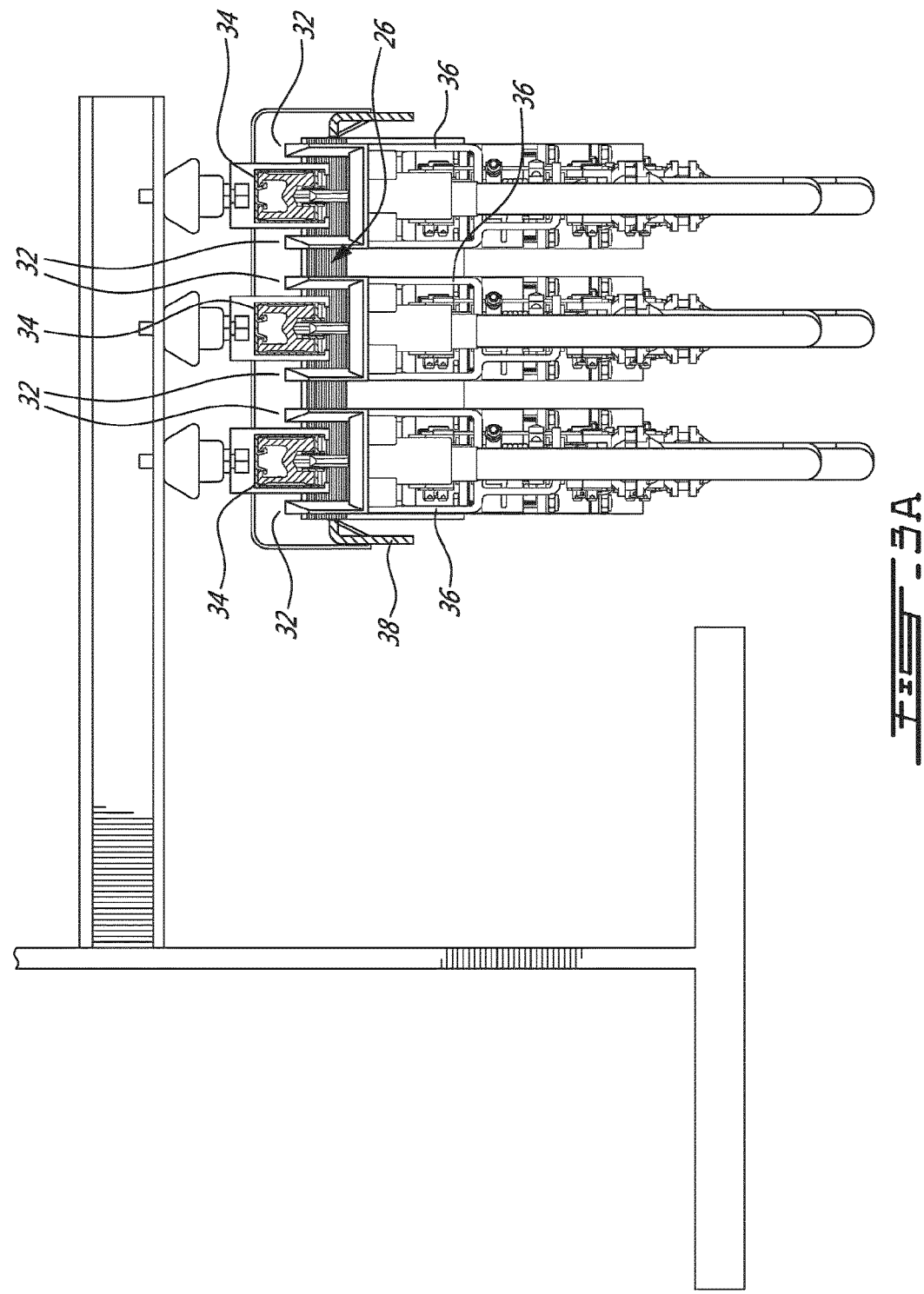
FIG. 3A is a cross-sectional view taken across the engaged conductor shoe assembly and conductor rail assembly.

FIG. 1 shows an example of a shoe derailment device 10 which is mounted to a conductor rail assembly 12 in a position of use, referred to herein as the "derailment position". More specifically, in the derailment position shown, the shoe derailment device 10 is positioned outside an predetermined operating zone 14 of a bridge crane 16, in the movement path of a conductor shoe assembly 18, in a manner that if a bridge 20 of the bridge crane 16 is erroneously moved outside the operating zone 14 by the operator and into the area occupied by the shoe derailment device 10, the conductor shoe assembly 18 of the bridge crane 16 will be derailed from the conductor rail assembly 12 by the shoe derailment device 10, which will cut electrical power to the electrical motors and thus stop the driving force behind the movement of the bridge 20.

Referring now to FIG. 2, the shoe derailment device 10 is shown alone. In this embodiment, the shoe derailment device 10 is elongated and was designed with a length which was determined to exceed a previously characterized maximum sliding distance expected from the bridge 20 when it is going at maximum speed prior to the interrupting of electrical power to the electrical motors. In this embodiment, to reach the satisfactory length, it was found more practical to produce the shoe derailment device 10 in the form of a plurality of body portions 22 arranged in an end-to-end configuration. The shoe derailment device 10 thus has a length which is aligned with the length of the conductor rail assembly 12 when in the derailment position. The end 24 of the shoe derailment device 10 which is oriented towards the conductor shoe assembly 18 when in the derailment position is provided with a wedge head 26. The wedge head 26 in this embodiment has a comb member 28 having a plurality of tapering prongs 30 which engage shoe-receiving spacings 32 between adjacent ones of the conductor rails 34 in a manner to gradually move conductor shoes 36 away from the conductor rails 34 as the conductor shoe assembly 18 is longitudinally slid across the wedge head 26.

In this embodiment, the shoe derailment device 10 also has an elongated body 38 which has a rectangular sheet of an electrically insulating material (e.g. a suitable plastic) having a thickness and a resistance deemed satisfactory for its intended purpose. As the conductor shoe assembly 18 is longitudinally slid along the shoe derailment device 10, it is thus first derailed from the conductor rail assembly 12 by the presence of the wedge head 26, and then maintained in the derailed state by the presence of the layer of electrically insulating material positioned between the derailed conductor shoe assembly 18 and the conductor rail assembly 12. At this stage, the power to the electrical motors of the bridge 20 being interrupted, the movement of the bridge 20 will typically decelerate until the conductor shoe assembly 18 stops sliding along the length of the body 38. It will be noted here that in this embodiment, guard walls 40 are provided on both lateral sides of the rectangular sheet of electrically insulating material and form part of the body 38.

It was exposed hereinabove that in this embodiment, the body 38 has a planar sheet-like portion which abuts against the conductor rail assembly 12. Accordingly, the face of the body 38 which abuts against the conductor rail assembly 12, which can be referred to as the abutment face 42 here, is planar and can be said to coincide with an abutment plane. It will be noted here that the prongs 30 of the wedge head 26 protrude both longitudinally from the body 38, and normal to the abutment plane, to satisfactorily engage the shoe-receiving spacings 32.

For ease of understanding and reference, FIG. 3A shows the engagement between the conductor shoe assembly 18 and the conductor rail assembly 12, with the shoes 36 engaged in the shoe-receiving spacings 32. It will be noted here that although the main purpose of the shoes 36 is to provide for guiding an electrical connection with the rails 34 during longitudinal displacement of the bridge 20, the shoes 36 can have some structural non-conductive portions as will be understood by persons having ordinary skill in the art.

The top plan view and side elevation view of the conductor rail assembly 12, conductor shoe assembly 18, and shoe derailment device 10 provided in FIGS. 3B and 3C provide further detail to assist in visualizing the action of derailment. More specifically, the operating zone 14 is defined here as extending along the conductor rail assembly 12 up to the position of the shoe derailment device 10. As the conductor shoe assembly 18 is moved out of the operating zone 14, into the area occupied by the shoe derailment device 10, in a movement shown by arrows 52 in FIG. 3C, the conductor shoes 36 engage a narrow end of the tapering prongs 30 forming the wedge head 26 and slide there along out from engagement with the rails 34 and against the insulating material of the body 38 of the shoe derailment device 10.

The wedge head 26 used in this example is shown in greater detail in FIGS. 4A and 4B, where it can be seen that the tapering prongs 30 project from a base portion 44 of the wedge head 26. In this embodiment, a slit 46 is defined horizontally into the base portion 44, into which the planar sheet material of the body 38 can be engaged. The wedge head 26 can be glued or fastened to the body 38, for instance. Referring to the rear elevation view of FIG. 4B, it can be seen that the shape of the underside of the rails 34 is cut out (or moulded out) from the wedge head 26 in order to allow the tapering prongs 30 to protrude into the shoe-receiving spacings 32 of the rails 34 to allow the wedge head 26 to progressively pry the shoes 36 away from the conductor rails 34.

It will be understood that while the designs of different makes of bridge cranes 16 are often similar, the exact configuration of the conductor rail assemblies 12 and conductor shoe assemblies 18 can vary. In many instances, the shoe derailment device 10 can be made compatible with different makes of bridge cranes 16 simply by adapting the design of the wedge head 26 to the particular design of the conductor rail assembly 12. Accordingly, the components of the shoe derailment device 10 can be provided in the form of a kit of parts with standard body portions 22 and a selection of wedge heads 26 each securable to a given one of the body portions 22 in a removable or permanent manner and each designed for a specific make of conductor rail assemblies 12 and corresponding shoe designs.

Should an additional safety precaution be required, such as if the conditions of use do not allow for a sufficient length of the shoe derailment device 10 or simply by abundance of caution, the end of the shoe derailment device 10 opposite the wedge head 26 can be provided with a stop 48, as depicted in FIG. 5, which can be designed to break the shoes 36 to prevent the electrical connection past the shoe derailment device 10 should the longitudinal movement of the conductor shoe assembly 18 exceed the length of the shoe derailment device 10.

Referring back to FIG. 1, it will be noted that in the illustrated embodiment, the shoe derailment device 10 is secured in the derailment position by use of a plurality of straps 50. This was found satisfactory in this embodiment, although it will be understood that in alternate embodiments, the shoe derailment device 10 can be secured to the conductor rail assembly 12 by other means, such as mechanical fasteners, clamps, or the like, to name a few examples.

As can be understood, the examples described above and illustrated are intended to be exemplary only. The scope is indicated by the appended claims.

What is claimed is:

1. A shoe derailment device for use in derailing a conductor shoe assembly of a bridge crane from a conductor rail assembly, the shoe derailment device comprising a wedge head provided at a longitudinal end of a body made of an electrically insulating material, the shoe derailment device being securable to the conductor rail assembly in a derailment position in which the shoe derailment device is positioned outside an operating zone of the bridge crane, in longitudinal alignment with the conductor rail assembly, in a movement path of the conductor shoe assembly, with the wedge head facing the operating zone in a manner that if the conductor shoe assembly is moved outside the operating zone, into the area occupied by the shoe derailment device, the conductor shoe assembly is derailed from the conductor rail assembly as the conductor shoe assembly engages the wedge head and is maintained in a derailed state by the electrically insulating material when the conductor shoe assembly is engaged with the body.

2. The shoe derailment device of claim 1, wherein the body has an abutment face received by the conductor rail assembly in the derailment position, and the wedge head has a comb member having a plurality of prongs protruding both longitudinally away from the body and vertically from a plane of the abutment face in a manner to protrude into corresponding shoe-receiving spacings formed between adjacent rails of the conductor rail assembly when in the derailment position.

3. The shoe derailment device of claim 2, wherein the comb member is removably attached to the end of the body.

4. The shoe derailment device of claim 1, wherein the body has two guard walls extending downwardly from both lateral edges of the body.

5. The shoe derailment device of claim 1, wherein other end of the body opposite the wedge head has a longitudinal stop protruding downwardly from the body.

6. The shoe derailment device of claim 5, wherein the stop is configured and adapted to break the conductor shoe assembly if the conductor shoe assembly reaches the longitudinal stop.

7. The shoe derailment device of claim 1, wherein the body has a plurality of bores along its length for securing the body to the conductor rail assembly using corresponding straps.

8. The shoe derailment device of claim 1, wherein the body includes a plurality of body portions in an end-to-end arrangement.

9. The shoe derailment device of claim 1 wherein the body is elongated and has a length associated to a characterized maximum stopping distance of the shoe along the shoe derailment device.

10. A method for derailing a conductor shoe assembly of a bridge crane from a conductor rail assembly, the shoe derailment device including a wedge head provided at a longitudinal end of a body made of an electrically insulating material, the shoe derailment device being secured to the conductor rail assembly in a derailment position in which the shoe derailment device is positioned outside an operating zone of the bridge crane, in longitudinal alignment with the conductor rail assembly, in a movement path of the conductor shoe assembly, with the wedge head facing the operating zone, the method comprising the steps of:

derailing the conductor shoe assembly from the conductor rail assembly when the conductor shoe assembly engages the wedge head; and maintaining the conductor shoe assembly in a derailed state by the electrically insulating material when the conductor shoe assembly is engaged with the body.

11. The method of claim 10, further comprising stopping the conductor shoe assembly at a position prior to the other longitudinal end of the body.

12. The method of claim 11, wherein said stopping further includes breaking the conductor shoe assembly if the conductor shoe assembly reaches said position.

13. A bridge crane comprising two runway beams being stationary and oriented parallel to one another in a longitudinal orientation, a bridge movably mounted to the two runway beams and having a length extending transversally across the two runway beams, the bridge being operable to move longitudinally along the two runway beams, a trolley mounted to the bridge and being operable to move transversally along the length of the bridge, a conductor rail assembly positioned parallel to and adjacent a corresponding one of the runway beams, a conductor shoe assembly made integral to the bridge and being engaged with the conductor rail assembly, the conductor rail assembly powering the bridge crane during operation via the conductor shoe assembly, the bridge crane being CHARACTERIZED IN THAT a shoe derailment device having a wedge head provided at a longitudinal end of a body made of an electrically insulating material is mounted to the conductor rail assembly in a derailment position in which the shoe derailment device is positioned outside an operating zone of the bridge crane, in longitudinal alignment with the conductor rail assembly, in a movement path of the conductor shoe assembly, with the wedge head facing the operating zone in a manner that if the conductor shoe assembly is moved outside the operating zone, into the area occupied by the shoe derailment device, the conductor shoe assembly is derailed from the conductor rail assembly as the conductor shoe assembly engages the wedge head and is maintained in a derailed state by the electrically insulating material when the conductor shoe assembly is engaged with the body.

14. The bridge crane of claim 13, wherein the shoe derailment device is removably mounted to the conductor rail assembly.

15. The bridge crane of claim 13, wherein the body has an abutment face received by the conductor rail assembly in the derailment position, and the wedge head has a comb member having a plurality of prongs protruding both longitudinally away from the body and vertically from a plane of the abutment face in a manner to protrude into corresponding shoe-receiving spacings formed between adjacent rails of the conductor rail assembly when in the derailment position.

16. The bridge crane of claim 13, wherein the body of the shoe derailment device has two guard walls extending downwardly from both lateral edges of the body.

17. The bridge crane of claim 13, wherein other end of the body opposite the wedge head has a longitudinal stop protruding downwardly from the body.

18. The bridge crane of claim 17, wherein the stop is configured and adapted to break the conductor shoe assembly if the conductor shoe assembly reaches the longitudinal stop.

19. The bridge crane of claim 13, wherein the body has a plurality of bores along its length for securing the body to the conductor rail assembly using corresponding straps.

20. The bridge crane of claim 13, wherein the body includes a plurality of body portions in an end-to-end arrangement.

* * * * *